(12) United States Patent
Wickens et al.

(10) Patent No.: US 10,081,080 B2
(45) Date of Patent: Sep. 25, 2018

(54) WELDING ASSEMBLIES FOR DRESSING ELECTRODE TIPS AND METHODS OF DRESSING ELECTRODE TIPS

(71) Applicant: HONDA MOTOR CO., LTD., Tokyo (JP)

(72) Inventors: Sonya Wickens, Ontario (CA); Thomas VanderEyken, Ontario (CA)

(73) Assignee: Honda Motor Co., Ltd., Tokyo (JP)

( * ) Notice: Subject to any disclaimer, the term of this patent is extended or adjusted under 35 U.S.C. 154(b) by 985 days.

(21) Appl. No.: 14/467,602

(22) Filed: Aug. 25, 2014

(65) Prior Publication Data

US 2016/0052093 A1 Feb. 25, 2016

(51) Int. Cl.

| | | |
|---|---|---|
| *B23P 19/00* | (2006.01) | |
| *B23K 35/40* | (2006.01) | |
| *B23K 11/11* | (2006.01) | |
| *B23K 11/30* | (2006.01) | |
| *B23K 11/31* | (2006.01) | |

(52) U.S. Cl.
CPC ............ *B23K 35/40* (2013.01); *B23K 11/115* (2013.01); *B23K 11/3063* (2013.01); *B23K 11/314* (2013.01); *Y10T 29/49204* (2015.01)

(58) Field of Classification Search
CPC ... B23K 35/40; B23K 11/3063; B23K 11/115; B23K 11/087; B23K 11/314; Y10T 29/49204; Y10T 29/59136; Y10T 29/59096
USPC ........... 29/722, 791, 795, 874; 409/137, 140
See application file for complete search history.

(56) References Cited

U.S. PATENT DOCUMENTS

| | | | |
|---|---|---|---|
| 2,298,633 A | 10/1942 | Winlock et al. | |
| 2,792,672 A | 5/1957 | Carlsen et al. | |
| 3,313,909 A | 4/1967 | Matthews | |
| 4,096,375 A * | 6/1978 | Fujino | B23K 11/087 219/101 |
| 4,610,153 A | 9/1986 | Nedorezov | |
| 4,966,504 A | 10/1990 | Seme, Jr. et al. | |
| 4,966,506 A | 10/1990 | Slanker | |
| 5,288,185 A | 2/1994 | Mattsson | |
| 5,332,342 A | 7/1994 | Kizaki et al. | |
| 5,401,127 A | 3/1995 | Nakajima et al. | |
| 5,445,481 A | 8/1995 | Nakajima et al. | |
| 5,725,340 A | 3/1998 | Nakajima et al. | |
| 5,993,125 A | 11/1999 | Shimada | |
| 6,151,124 A | 11/2000 | Visscher | |
| 6,184,487 B1 | 2/2001 | Visscher | |
| 6,195,860 B1 | 3/2001 | Di Rosa et al. | |
| 6,499,921 B1 | 12/2002 | Frasher | |
| 6,666,631 B2 * | 12/2003 | Yajima | B23K 11/3063 409/137 |
| 6,722,004 B2 | 4/2004 | Recupero | |
| 6,863,597 B2 | 3/2005 | Sunaga et al. | |

(Continued)

*Primary Examiner* — Donghai D Nguyen
(74) *Attorney, Agent, or Firm* — Armstrong Teasdale, LLP

(57) ABSTRACT

A welding assembly includes a tip dress unit for dressing an electrode tip and a tip cleaning unit having a brush rotating during a cleaning operation. The tip cleaning unit is used to clean the electrode tip prior to the electrode tip being moved to the tip dress unit. The brush may be a wire brush. The brush may clean multiple electrode tips simultaneously. The brush may remove debris, such as sealer, oil, or particles from the electrode tip. The tip cleaning unit may include a shield at least partially surrounding the brush.

16 Claims, 3 Drawing Sheets

(56) References Cited

U.S. PATENT DOCUMENTS

| | | |
|---|---|---|
| 6,918,823 B2 | 7/2005 | Tamm |
| 7,257,872 B2 | 8/2007 | Shim |
| 7,289,862 B2 | 10/2007 | Britton |
| 7,458,139 B2 | 12/2008 | Nakazima |
| 7,657,984 B2 | 2/2010 | Hopkins et al. |
| 7,689,298 B2 | 3/2010 | Britton |
| 7,789,600 B2 | 9/2010 | Goto et al. |
| 7,972,194 B2 | 7/2011 | Call et al. |
| 8,388,283 B2 | 3/2013 | Decker et al. |
| 8,415,582 B2 | 4/2013 | Wang et al. |
| 8,732,884 B1 * | 5/2014 | Woslager ............ A46B 13/003 15/179 |
| 2003/0013395 A1 | 1/2003 | Sakai |
| 2008/0237199 A1 | 10/2008 | Phillips |
| 2009/0173725 A1 | 7/2009 | Holcomb et al. |
| 2012/0126471 A1 | 5/2012 | Park |
| 2013/0260648 A1 | 10/2013 | Rementer |

\* cited by examiner

WELDING ASSEMBLIES FOR DRESSING ELECTRODE TIPS AND METHODS OF DRESSING ELECTRODE TIPS

BACKGROUND

The present disclosure relates generally to tip dressing of electrode tips of welding assemblies.

Welding assemblies used for resistance welding have electrode tips that are used for spot welding metal pieces together. The electrode tips become worn out or deformed over time and may accumulate debris build-up. When welding work is performed with worn-out electrode tips, weld quality is diminished. As such, electrode tips are periodically dressed at a tip dress unit to maintain welding quality at a tip dress unit. Conventional tip dress units have a cutter mounted in a holder, which is automatically or manually rotated to reform the electrode tips.

However, debris (e.g. sealer, oil, metal buildup on the electrode tips, and the like) clogging the tip dress units may negatively affect operation of the tip dress units. For example, the debris may clog the cutter causing the cutter to function improperly and/or not form the electrode tips properly. When the tip dress unit is not functioning properly, subsequent welds may be negatively affected. In current systems, the welding assembly is stopped at regular intervals to manually clean the tips and remove the debris, resulting in equipment downtime. Additionally, when a tip dress unit clog occurs, the equipment is stopped and manually cleaned, again resulting in downtime.

A need remains for a welding assembly capable of performing tip dressing in a cost effective and reliable manner.

BRIEF DESCRIPTION

In one embodiment, a welding assembly is provided including a tip dress unit for dressing an electrode tip and a tip cleaning unit having a brush rotating during a cleaning operation. The tip cleaning unit is used to clean the electrode tip prior to the electrode tip being moved to the tip dress unit. The brush may be a wire brush. The brush may clean multiple electrode tips simultaneously. The brush may remove debris, such as sealer, oil, or particles from the electrode tip. The tip cleaning unit may include a shield at least partially surrounding the brush.

In another embodiment, a welding assembly is provided including a welding robot having an arm configured to move in three dimensional space with electrode tips at an end of the arm. The welding robot moves the electrode tips between a welding station, a tip cleaning station and a tip dressing station. A tip cleaning unit is provided at the tip cleaning station. The tip cleaning unit has a brush rotating during a cleaning operation, wherein the tip cleaning unit is used to clean the electrode tips prior to the electrode tips being moved to the tip dressing station. A tip dress unit is provided at the tip dressing station. The tip dress unit has a cutting head with at least one blade for cutting the electrode tips during a dressing operation.

In a further embodiment, a method of dressing electrode tips is provided that includes moving the electrode tips to a tip cleaner unit, cleaning the electrode tips at the tip cleaner unit, moving the electrode tips to a tip dresser unit, and cutting the electrode tips at the tip dresser unit.

DETAILED DESCRIPTION

Various embodiments of methods and systems for dressing electrode tips are provided. It should be noted that although the various embodiments are described in connection with the automotive industry, such as for an automobile assembly process, one or more embodiments may be implemented in different industries and for different applications.

One or more embodiments include a tip cleaning unit used to remove foreign debris from the electrode tips, such as sealer, oil, particles, metal buildup, and the like. The tip cleaning unit removes the foreign debris prior to moving the electrode tips to a tip dressing unit. Removal of such debris reduces clogging of the tip dressing unit, increasing the performance and operating lifetime of the tip dressing unit. Removal of such debris by the tip cleaning unit can be performed automatically without manual operator intervention. As such, downtime of the overall welding system is reduced, increasing throughput of the product being welded.

Figure 1:
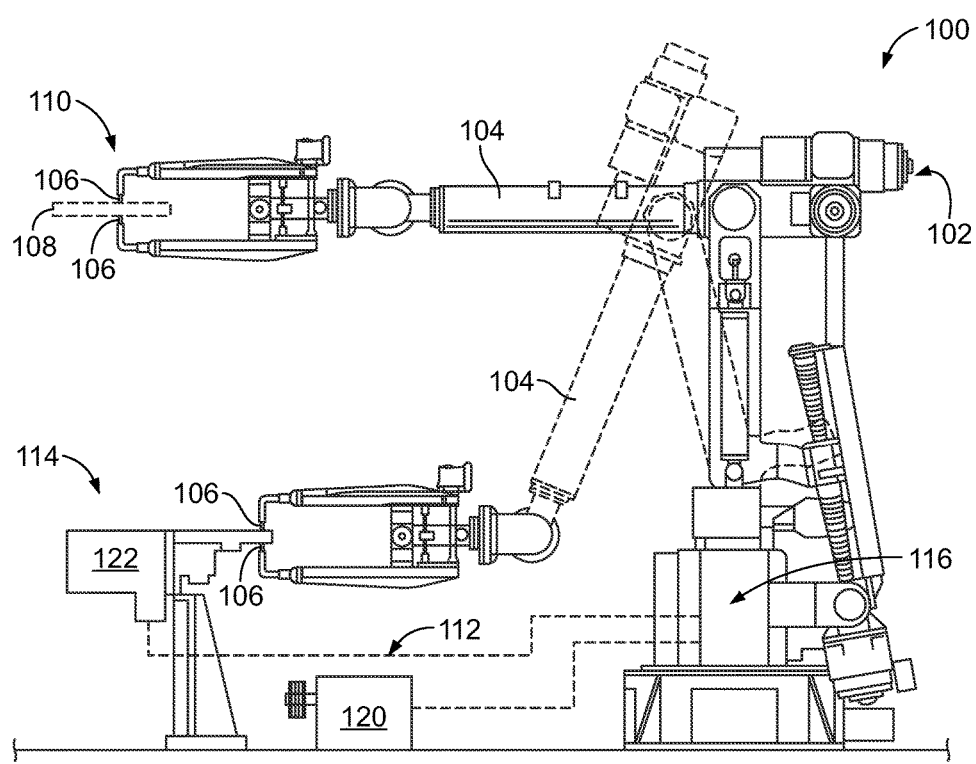
FIG. 1 is a schematic illustration of a welding assembly in accordance with one embodiment.

FIG. 1 is a schematic illustration of a welding assembly 100 in accordance with one embodiment. The welding assembly 100 includes a welding robot 102 having an arm 104 configured to move in three dimensional space (e.g., movable in X, Y and Z directions). The welding robot 102 has electrode tips 106 at an end of the arm 104. The electrode tips 106 are configured for use in resistance welding, such as for spot welding a component 108. The welding robot 102 moves the electrode tips 106 between a welding station 110, a tip cleaning station 112 and a tip dressing station 114. In other embodiments, it may be desirable to use only some of these stations. In other embodiments, other stations may be added as desired. The stations may be oriented for convenient access by the welding robot 102. The stations may be arranged as port of a vehicle assembly line process.

A control module 116 is operably coupled to the welding robot 102 to control movement of the welding robot 102, such as to control the position of the arm 104 and electrode tips 106 at each station and/or to control movement between the various stations. The control module 116 may be operably coupled to the electrode tips 106, such as to control an ON/OFF state of the electrode tips 106 during welding at the welding station 110.

A tip cleaning unit 120 is provided at the tip cleaning station 112. The tip cleaning unit 120 may be operated during a cleaning operation to clean the electrode tips 106. In an exemplary embodiment, the electrode tips 106 are moved to the tip cleaning unit 120 at the tip cleaning station 112 prior to moving to the tip dressing station 114. As such, the electrode tips 106 may be cleaned prior to tip dressing. Optionally, the control module 116 may be operably coupled to the tip cleaning unit 120 to control operation of the tip cleaning unit 120. For example, the control module 116 may start and stop the tip cleaning unit 120 based on the location of the electrode tips 106. For example, the tip cleaning unit 120 may be turned on as the electrode tips 106 are moved to the tip cleaning station 112 and the tip cleaning unit 120 is turned off as the electrode tips 106 are moved from the tip cleaning station 112 to the tip dressing station 114.

A tip dress unit 122 is provided at the tip dressing station 114. The tip dress unit 122 may be operated during a dressing operation to dress (e.g., cut) the electrode tips 106. In an exemplary embodiment, the electrode tips 106 are moved to the tip dress unit 122 at the tip dressing station 114 after the electrode tips 106 are cleaned at the tip cleaning unit 120. As such, foreign debris from the electrode tips 106, such as sealer, oil, particles, metal buildup, and the like is pre-removed prior to the dressing operation. Clogging of the tip dress unit 122 is less likely when the electrode tips 106 are pre-cleaned. Optionally, the control module 116 may be operably coupled to the tip dress unit 122 to control operation of the tip dress unit 122. For example, the control module 116 may start and stop the tip dress unit 122 based on the location of the electrode tips 106. For example, the tip dress unit 122 may be turned on to start the dressing operation when the electrode tips 106 are in position and the tip dress unit 122 may be turned off when the electrode tips 106 are moved away from the tip dressing station 114, such as back to the welding station 110.

The control module 116 may form part of or be embodied as one or more computing systems, such as one or more PLCs. It should be noted that while a particular computing or operating environment may be described herein, the computing or operating environment is intended to illustrate operations or processes that may be, implemented, performed, and/or applied to a variety of different computing or operating environments. Thus, FIG. 1 illustrates a non-limiting example of a controller or that may perform one or more methods or processes as described in more detail herein.

The control module 116 may be provided, for example, as any type of computing device, including, but not limited to PLCs or personal computing systems, among others. The control module 116 may optionally include components not shown in FIG. 1, and/or some components shown in FIG. 1 may be peripheral components that do not form part of or are not integrated into the computing system. The control module 116 may include one or more physical devices configured to execute one or more instructions. For example, the control module 116 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result.

The control module 116 may include one or more processors and/or computing devices that are configured to execute software instructions, such as programmed using application software. In some embodiments, one or more algorithms as described herein are embedded into the PLC. Additionally or alternatively, the control module 116 may include one or more hardware or firmware logic machines configured to execute hardware or firmware instructions. The control module 116 may optionally include individual components that are distributed throughout two or more devices, which may be remotely located in some embodiments.

Thus, the various components, subsystems, or modules of the welding assembly 100 may be implemented in hardware, software, or a combination thereof, as described in more detail herein. Additionally, the processes, methods, and/or algorithms described herein may be performed using one or more processors, processing machines or processing circuitry to implement one or more methods described herein.

Figure 2:
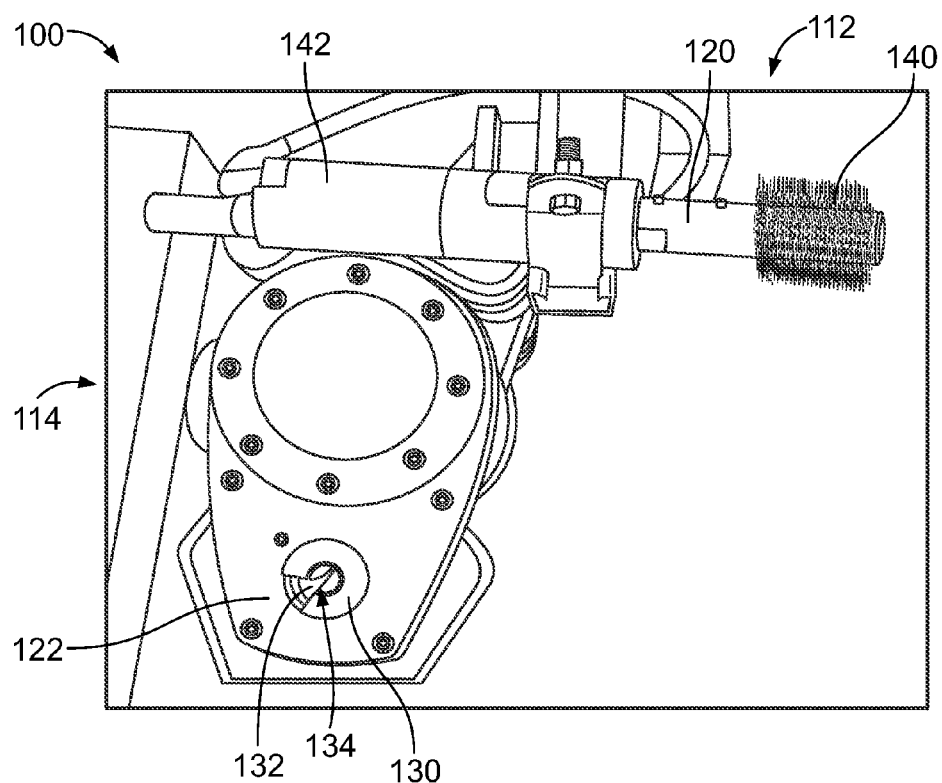
FIG. 2 is a top perspective view of a portion of the welding assembly shown in FIG. 1 showing a tip cleaning unit and a tip dress unit.
Figure 3:
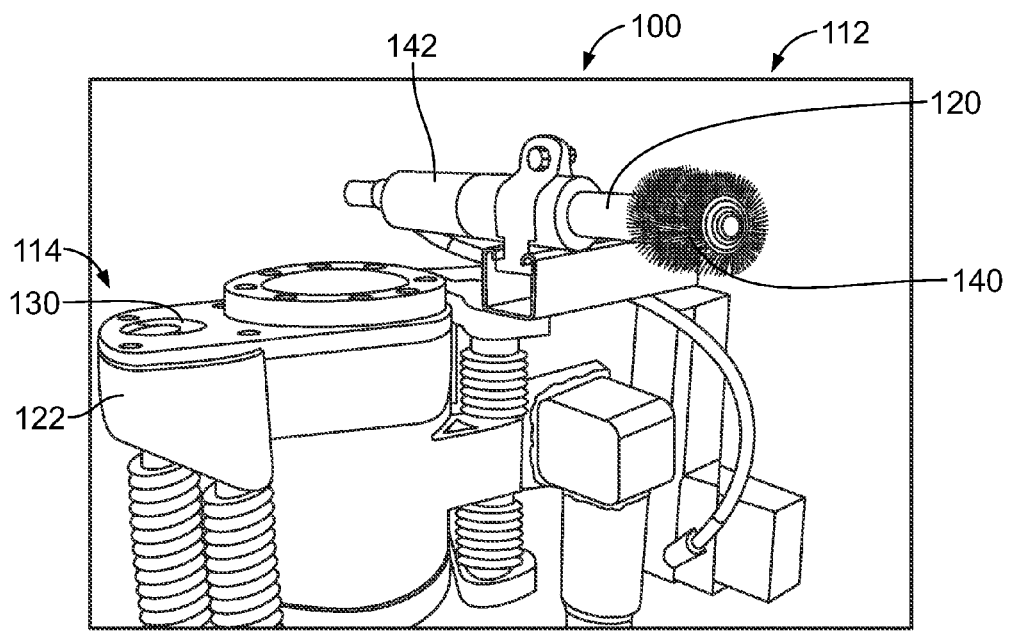
FIG. 3 is a side perspective view of a portion of the welding assembly shown in FIG. 1 showing the tip cleaning unit and tip dress unit.

FIG. 2 is a top perspective view of a portion of the welding assembly 100 showing the tip cleaning unit 120 and tip dress unit 122. FIG. 3 is a side perspective view of a portion of the welding assembly 100 showing the tip cleaning unit 120 and tip dress unit 122.

The tip dress unit 122 includes a cutting head 130 with at least one blade 132 for cutting the electrode tip(s) 106 (shown in FIG. 1) during a dressing operation. The electrode tips 106 are configured to be pressed into the cutting head 130 where the electrode tips 106 are formed by the blade 132, such as by cutting the electrode tips 106. The cutting head 130 includes an aperture 134 and the blade 132 is exposed in the aperture 134. In an exemplary embodiment, to avoid clogging of the aperture 134 and/or binding of the blade 132, the electrode tips 106 are pre-cleaned at the tip cleaning unit 120.

The tip cleaning unit 120 has a brush 140 that is used to clean the electrode tips 106. The brush 140 is rotated during a cleaning operation and the electrode tips 106 are moved into contact with the brush 140 where foreign debris on the electrode tips 106 is removed. The brush 140 is used to clean the electrode tips 106 prior to the electrode tips 106 being moved to the cutting head 130 of the tip dress unit 122. Optionally, the brush 140 may be a wire brush. In an exemplary embodiment, the brush 140 cleans multiple electrode tips 106 simultaneously. For example, both electrode tips 106 may be simultaneously brought into contact with the brush 140 (e.g., squeezed against the rotating brush) so that as the brush 140 is rotating, both electrode tips 106 are being cleaned. The brush 140 removes debris, such as sealer, oil, or particles, from the electrode tips 106. The brush 140 is soft enough that the brush 140 does not damage the electrode tips 106 during cleaning.

The tip cleaning unit 120 has a motor 142, and the brush 140 is operably coupled to the motor 142. The motor 142 is used to rotate the brush 140. The motor 142 may be operably coupled to the control module 116 (shown in FIG. 1) to control operation of the tip cleaning unit 120. For example, the control module 116 may power the motor 142 to rotate the brush 140 when the electrode tips 106 are moved into the vicinity of the tip cleaning unit 120, while at other times, the motor 142 is turned off to conserve energy and operating life of the motor 142. The control module 116 may power the motor 142 when the welding assembly 100 is in a dressing mode, such as when the electrode tips 106 are moved from the welding station 110 toward the tip dress unit 122, and the electrode tips 106 may be first moved to the tip cleaning unit 120 prior to the dressing operation.

Figure 4:
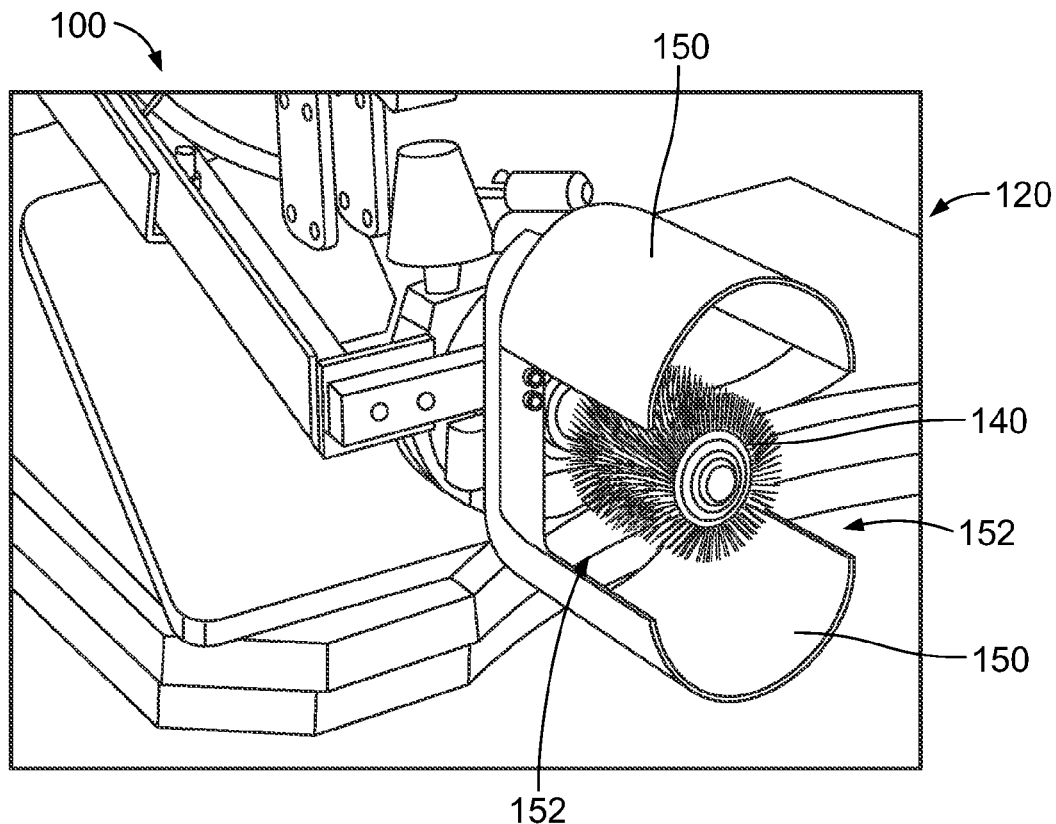
FIG. 4 is a side perspective view of a portion of the welding assembly shown in FIG. 1 showing the tip cleaning unit with a shield.

FIG. 4 is a side perspective view of a portion of the welding assembly 100 showing the tip cleaning unit 120 with a shield 150 mounted around the brush 140. The shield 150 at least partially surrounds the brush 140 and prevents debris removed from the electrode tips 106 (shown in FIG. 1) from passing to the tip dress unit 122 or other areas of the welding assembly 100, such as the welder station 110. For example, the shield 150 stops the debris from being thrown away from the tip cleaning unit 120 as the brush 140 spins.

The shield 150 may be placed in close proximity to the brush 140, such as within approximately 1 inch of the brush 140; however the shield 150 may be placed at any appropriate distance from the brush 140. The shield 150 may have any desired shape, such as a curved shape, to position the shield 150 around the brush 140.

The shield 150 includes at least one opening 152 therethrough, and in the illustrated embodiments, includes two openings 152 at opposite sides of the brush 140. The electrode tips 106 pass through the openings 152 to engage the brush 140. Optionally, the openings 152 may be blocked by wire curtains or other components that allow the electrode tips 106 to pass therethrough but that provide some structure across the openings 152 to block the debris from passing through the openings 152.

Figure 5:
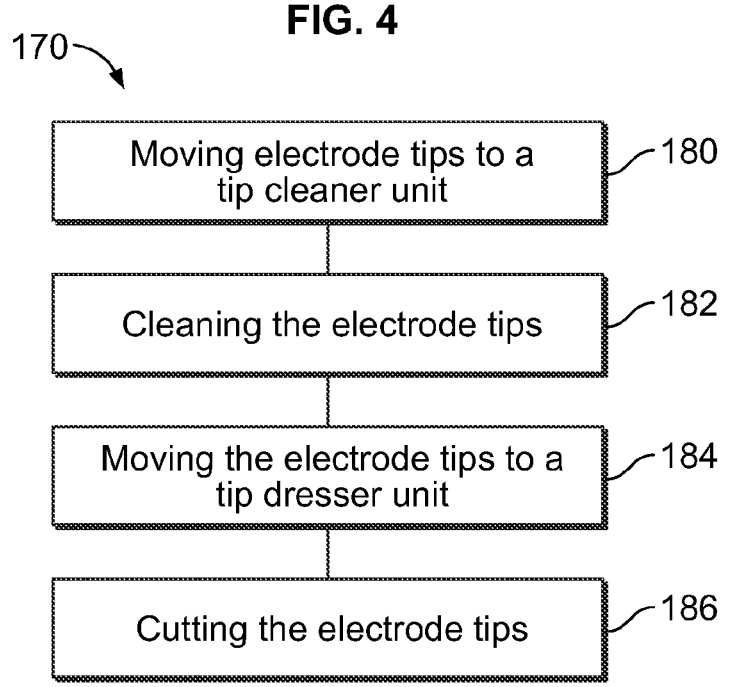
FIG. 5 illustrates a tip dressing method in accordance with an exemplary embodiment.

FIG. 5 illustrates a tip dressing method 170 in accordance with an exemplary embodiment. The method 170, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 170 may be able to be used as one or more algorithms to direct hardware to perform operations described herein.

The method 170 includes moving 180 electrode tips to a tip cleaner unit. For example, the electrode tips may be provided at an end of an arm of a welding robot and the welding robot may move the electrode tips into position at a tip cleaning station.

The method 170 includes cleaning 182 the electrode tips at the tip cleaner unit. For example, the cleaning may be performed by a rotating brush that is operated to remove the debris from the electrode tips. The electrode tips may be squeezed against the rotating brush, which wipes or otherwise removes the debris from the electrode tips. For example, the rotating brush may remove sealer, oil, particles, metal buildup, and the like from the electrode tips.

The method 170 includes moving 184 the electrode tips to a tip dresser unit after the electrode tips are cleaned at the tip cleaner unit. The electrode tips may be moved by the welding robot. The method 170 includes cutting 186 the electrode tips at the tip dresser unit. The electrode tips are moved and cut after being cleaned so that the debris does not clog or damage the tip dresser unit. Less maintenance and blade changing of the tip dresser unit may result. Better welds may result because better tip dressing may be performed on the cleaned electrode tips, leading to less expulsion and between weld appearance. Less scrape or waste results from the better welds.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A welding assembly comprising:
   a welding robot having an arm configured to move in three dimensional space, the welding robot having electrode tips at an end of the arm, the welding robot moving the electrode tips along a path of motion between a welding station, a tip cleaning station and a tip dressing station;
   a tip cleaning unit at the tip cleaning station, the tip cleaning unit having a brush rotating during a cleaning operation; and
   a tip dress unit at the tip dressing station, the tip dress unit having a cutting head for dressing the electrode tips during a dressing operation, wherein the tip dress unit is located downstream from the tip cleaning unit along the path of motion of the welding robot to enable the tip cleaning unit to clean the electrode tips prior to the tip dress unit dressing the electrode tips.

2. The welding assembly of claim 1, wherein the brush cleans multiple electrode tips simultaneously.

3. The welding assembly of claim 1, wherein the brush removes debris comprising at least one of sealer, oil, and particles from the electrode tip.

4. The welding assembly of claim 1, wherein the tip cleaning unit has a motor, the brush being operably coupled to the motor, the motor being operated when the electrode tip is moved into the vicinity of the tip cleaning unit.

5. The welding assembly of claim 1, wherein the cutting head includes at least one blade for cutting an electrode tip during the dressing operation, the tip cleaning unit being used to clean the electrode tip prior to the electrode tip being moved to the cutting head of the tip dress unit.

6. The welding assembly of claim 1, wherein the brush is wire brush.

7. The welding assembly of claim 1, wherein the tip cleaning unit includes a shield at least partially surrounding the brush.

8. The welding assembly of claim 6, wherein the shield prevents debris removed from the electrode tip from passing to the tip dress unit.

9. The welding assembly of claim 7, wherein the shield has a first opening and a second opening, the electrode tips pass through the first and second openings to engage the brush.

10. The welding assembly of claim 9, wherein a second electrode tip passes through the second opening to engage the brush.

11. The welding assembly of claim 10, wherein the first and second openings are on opposite sides of the brush.

12. The welding assembly of claim 9, wherein the first and second openings are on opposite sides of the brush.

13. A method of dressing electrode tips located at the end of an arm of a welding robot, the method comprising:
   moving, using the welding robot, the electrode tips to a tip cleaner unit at a tip cleaning station, the tip cleaner unit having a brush rotating during a cleaning operation;
   cleaning the electrode tips at the tip cleaner unit;
   moving, using the welding robot, the electrode tips to a tip dresser unit at a tip dressing station, the tip dress unit having a cutting head for dressing the electrode tips during a dressing operation; and
   dressing the electrode tips at the tip dresser unit, wherein the welding robot configured to move the electrode tips along a path of motion between a welding station, the tip cleaning station and the tip dressing station, and the tip dress unit is located downstream from the tip cleaning unit along the path of motion of the welding robot such that the tip cleaning unit cleans the electrode tips prior to the tip dress unit dressing the electrode tips.

14. The method of claim 13, wherein said cleaning the electrode tips comprises simultaneously cleaning the electrode tips.

15. The method of claim 13, wherein said cleaning the electrode tips comprises removing debris foreign to the electrode tips from the electrode tips.

16. The method of claim 13, wherein said moving the electrode tips to the tip cleaning unit comprises moving the electrode tips through openings in a shield to a rotating brush of the tip cleaning unit, said cleaning the electrode tips comprises rotating the brush on the electrode tips to remove debris from the electrode tips.

* * * * *